US012792344B2

(12) United States Patent
Ricchuiti et al.

(10) Patent No.: US 12,792,344 B2
(45) Date of Patent: Nov. 10, 2026

(54) DISCOVERING MODULAR APPLICATION COMPONENTS USING CONTINUOUS INTEGRATION AND CONTINUOUS DELIVERY AND COMPONENT MARKETPLACE

(71) Applicant: Capital One Services, LLC, McLean, VA (US)

(72) Inventors: Andrew Ricchuiti, Dallas, TX (US); Ajmal Karuthakantakath, Flower Mound, TX (US); Jordan Donais, Little Elm, TX (US); Raghavendra Dharmavaram, Little Elm, TX (US); Brian Dinh, Plano, TX (US); Sayak Banerjee, Allen, TX (US); Chengwei Lim, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 304 days.

(21) Appl. No.: 18/416,648

(22) Filed: Jan. 18, 2024

(65) Prior Publication Data

US 2025/0238229 A1 Jul. 24, 2025

(51) Int. Cl.
*G06F 8/77* (2018.01)
*G06F 8/73* (2018.01)
*G06F 11/3604* (2025.01)

(52) U.S. Cl.
CPC .................. *G06F 8/77* (2013.01); *G06F 8/73* (2013.01); *G06F 11/3616* (2013.01)

(58) Field of Classification Search
CPC ........... G06F 8/73; G06F 11/3616; G06F 8/77
See application file for complete search history.

(56) References Cited

U.S. PATENT DOCUMENTS 11,789,963 B2 10/2023 Banerjee et al.
2018/0275970 A1* 9/2018 Woulfe ..................... G06F 8/70
2019/0317754 A1* 10/2019 Mosquera ........... G06F 11/3495
2022/0141029 A1* 5/2022 Dahmen ................. G06F 21/64
713/176
2023/0035109 A1 2/2023 Wang et al.
2024/0143404 A1* 5/2024 Enomoto ................ G06F 21/30
2024/0281248 A1* 8/2024 Shah .......................... G06F 8/77
2024/0311146 A1* 9/2024 M ............................. G06F 8/65
2024/0411544 A1* 12/2024 Vijaywargiya ............ G06F 8/71
2025/0208983 A1* 6/2025 Hazarika ............. G06F 11/3688

FOREIGN PATENT DOCUMENTS

CN 118377518 A * 7/2024 .......... G06F 11/1479

* cited by examiner

*Primary Examiner* — Phillip H Nguyen
(74) *Attorney, Agent, or Firm* — Harrity & Harrity, LLP

(57) ABSTRACT

In some implementations, a system may receive via a CI/CD pipeline, a first request to register code associated with one or more modular application components. The system may perform, based on the first request to register the code associated with the one or more modular application components, one or more application program interface (API) calls to obtain information related to the code associated with the one or more modular application components from a release management system. The system may publish to a component marketplace, the information related to the code associated with the one or more modular application components. The system may receive, from a developer device, a second request to access the one or more modular application components. The system may provide, to the developer device, access to the one or more modular application components.

20 Claims, 4 Drawing Sheets

DISCOVERING MODULAR APPLICATION COMPONENTS USING CONTINUOUS INTEGRATION AND CONTINUOUS DELIVERY AND COMPONENT MARKETPLACE

BACKGROUND

In software engineering, continuous integration and continuous delivery (CI/CD), sometimes referred to as continuous integration and continuous deployment, generally includes techniques to combine continuous integration (CI) and continuous delivery (CD) practices. For example, continuous integration practices include techniques to frequently merge small code updates into a main branch, and continuous delivery practices include techniques where development teams produce software in relatively short cycles with high speed and frequency such that reliable software or updated software can be released at any time using a simple and repeatable deployment process. CI/CD techniques bridge gaps between development and operation activities and software development teams by enforcing automation in building, testing, and deploying software applications.

SUMMARY

Some implementations described herein relate to a system for discovering modular application components using continuous integration (CI) and continuous delivery (CD) (CI/CD) and a component marketplace. The system may include one or more memories and one or more processors communicatively coupled to the one or more memories. The one or more processors may be configured to receive, via a CI/CD pipeline, a first request to register code associated with one or more modular application components. The one or more processors may be configured to perform, based on the first request to register the code associated with the one or more modular application components, one or more application program interface (API) calls to obtain information related to the code associated with the one or more modular application components from a release management system. The one or more processors may be configured to publish, to the component marketplace, the information related to the code associated with the one or more modular application components. The one or more processors may be configured to receive, from a developer device, a second request to access the one or more modular application components. The one or more processors may be configured to provide, to the developer device, access to the one or more modular application components.

Some implementations described herein relate to a method for discovering modular application components using CI/CD. The method may include receiving, by a system, via a CI/CD pipeline, a first request to register code associated with one or more modular application components. The method may include performing, by the system and based on the first request to register the code associated with the one or more modular application components, one or more API calls to obtain information related to the code associated with the one or more modular application components from a release management system. The method may include publishing, by the system, to a component marketplace, the information related to the code associated with the one or more modular application components. The method may include receiving, by the system and from a developer device, a second request to access the one or more modular application components. The method may include providing, by the system and to the developer device, access to the one or more modular application components.

Some implementations described herein relate to a non-transitory computer-readable medium that stores a set of instructions. The set of instructions, when executed by one or more processors of a system, may cause the system to receive, via a CI/CD pipeline, a first request to register code associated with one or more modular application components. The set of instructions, when executed by one or more processors of the system, may cause the system to perform, based on the first request to register the code associated with the one or more modular application components, one or more API calls to obtain information related to the code associated with the one or more modular application components from a release management system. The set of instructions, when executed by one or more processors of the system, may cause the system to publish, to a component marketplace, the information related to the code associated with the one or more modular application components. The set of instructions, when executed by one or more processors of the system, may cause the system to receive, from a developer device, a second request to access the one or more modular application components. The set of instructions, when executed by one or more processors of the system, may cause the system to provide, to the developer device, access to the one or more modular application components.

DETAILED DESCRIPTION

Figure 1:
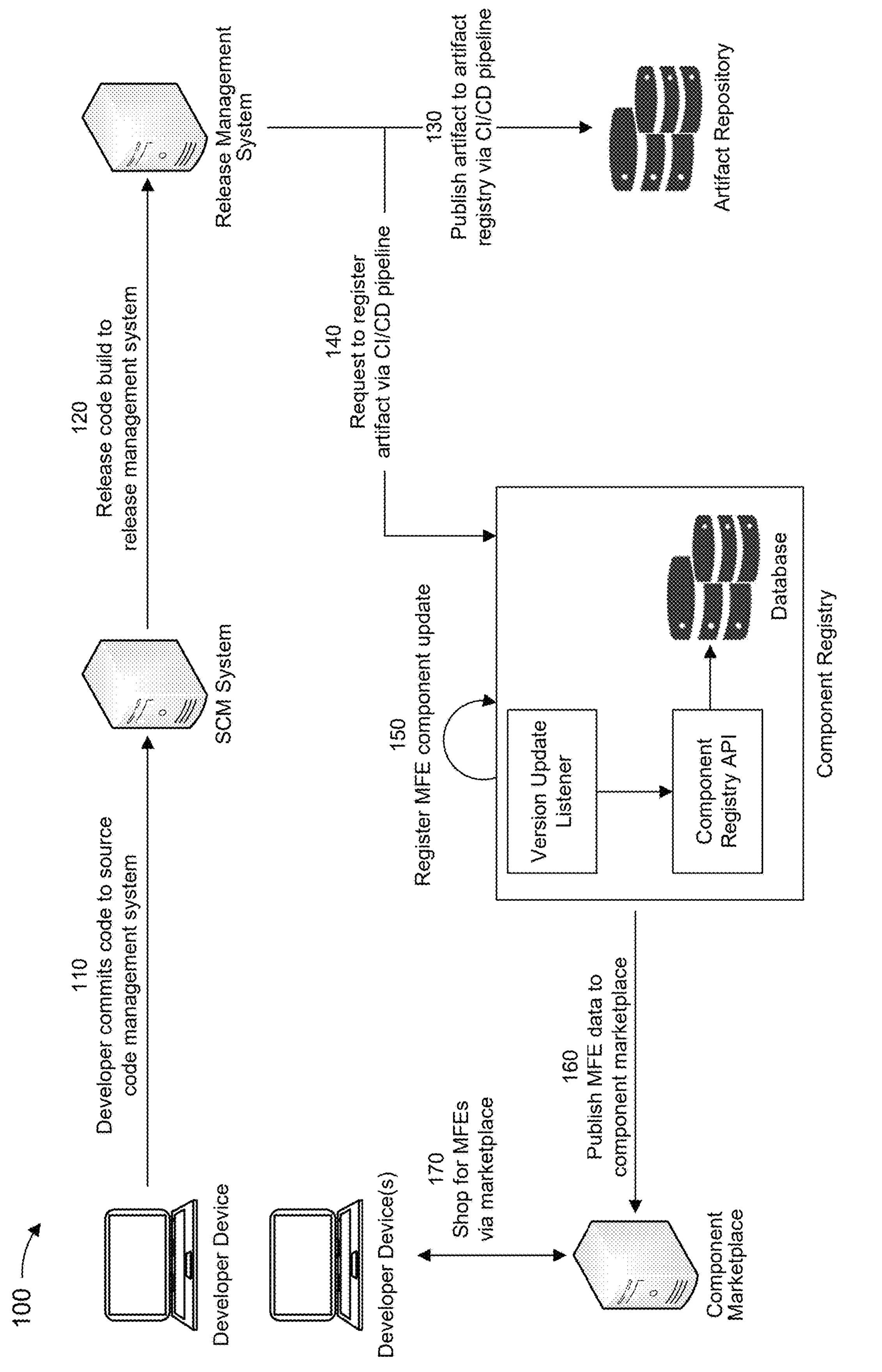
FIG. 1 is a diagram of an example associated with discovering modular application components using continuous integration (CI) and continuous delivery (CD) (CI/CD) and a component marketplace, in accordance with some embodiments of the present disclosure.

The following detailed description of example implementations refers to the accompanying drawings. The same reference numbers in different drawings may identify the same or similar elements.

A monolithic software architecture is a traditional and unified approach to software development where all application components are interconnected and interdependent, forming a single cohesive unit. In monolithic software architectures, an entire software application (e.g., including a user interface shell and all application components) is tightly coupled, typically with a single codebase and deployed as a single unit. Despite the simplicity that monolithic software architectures offer with respect to development and initial deployment, monolithic software architectures pose various challenges as software projects grow larger, which can adversely impact agility and scalability. For example, modifications or updates to specific functionalities within one or more application components often require that the entire application be redeployed (e.g., an entire user interface shell needs to be redeployed whenever there are changes to any application components), which results in monolithic software architectures lacking flexibility in terms of scalability and/or maintenance. Furthermore, due to dependencies between application components and the user interface shell in a monolithic software architecture, independently updating application components is challenging because changes in one application component might introduce unintended consequences in other application components. In addition, monolithic software architectures are associated with significant operational overhead, as redeploying an entire user interface shell when an application component is updated involves stopping and restarting the application, which increases operation overhead, increases downtime and deployment time, and causes user disruption.

Accordingly, in some implementations, as described herein, a modular software application may be designed using a micro frontend (MFE) architecture to address challenges posed by traditional monolithic software applications. For example, in an MFE architecture pattern, a web application may be designed and developed in a manner that aims to address challenges posed by monolithic frontend systems. For example, in an MFE architecture pattern, a complex web application is typically decomposed into several smaller, self-contained, and loosely coupled frontend modules, with each module responsible for a specific feature or specific functionality. The modules, often referred to as "micro frontends," are generally developed, tested, and deployed independently, which allows different teams to work on separate parts of the application concurrently. The modularized MFE architecture also fosters better code organization, reusability, and maintainability, and enables efficient scaling and reducing the impact of changes or updates to a specific MFE. For example, by adhering to certain standards, MFE application components can be composed into a target web application at browser runtime.

Accordingly, as described herein, a modular software application may be decomposed into several application components that each operate as an independent unit with a separate codebase, technologies, and/or CI/CD pipeline. Furthermore, because different application components are isolated from one another (e.g., through one or more application program interfaces (APIs), communication protocols, manifests, and/or runtime boundaries), changes or updates to one application component do not impact other application components. In this way, the modular software application may support dynamic loading, where one or more application components can be loaded and/or updated at runtime without requiring a full restart of the modular application system. Furthermore, the ability to dynamically load application components may enable versioning strategies, where different versions of application components (e.g., an initial release of a first application component and an updated release of a second application component) can coexist within the modular software application (e.g., allowing phased updates, systematic release and/or enabling features, and/or rollback mechanisms to earlier versions, among other examples).

Furthermore, some implementations described herein may use a CI/CD pipeline to enable software development teams to discover modular application components (e.g., MFE components) via a component marketplace. For example, software development teams often create similar frontend components independently, which can lead to duplicated effort and inconsistency across applications. Furthermore, traditional front development tends to follow an inefficient development cycle, especially in large-scale applications, which can be slow and cumbersome and hinder rapid deployment and updates to application components. Other challenges that are posed in existing software development systems include a lack of scalability and flexibility (e.g., because updating and scaling monolithic frontend applications is challenging and often requires extensive testing and coordination), an inconsistent user experience (e.g., because different development teams may create divergent user interface components, leading to a disjointed user experience), knowledge silos (e.g., where expertise in frontend development is often confined within specific teams, limiting collaborative opportunities and shared learning), and difficulties with adaptation to new technologies (e.g., because a learning curve to integrate new technologies or frameworks into an existing systems can be steep, slowing progress).

Accordingly, some implementations described herein relate to an automated self-onboarding process that is built into a CI/CD pipeline to automatically register modular application components and/or updates to modular application components in a component marketplace. For example, the modular application components accessible via the component marketplace may each carry out one or more specific capabilities or functions within a modular software application, and may be configured to execute one or more backend APIs independently. In some implementations, the component marketplace may provide one or more interfaces that allow developers to search the modular application components in the component marketplace and request that the owner(s) of a modular application component provide permission to use the modular application component. Accordingly, based on the owner(s) of a modular application component providing permission to use the requested modular application component, other developers can then access the requested modular application component and integrate the requested modular application component into their own modular software application(s). In this way, some implementations described herein may provide an automated and centralized platform to allow developers to share and reuse modular application components.

FIG. 1 is a diagram of an example 100 associated with discovering modular application components using CI/CD and a component marketplace. As shown in FIG. 1, example 100 includes a developer device, a source code management system, a release management system, an artifact repository, a component registry, and a component marketplace. The developer device, the source code management system, the release management system, the artifact repository, the component registry, and the component marketplace are described in more detail in connection with FIG. 2 and FIG. 3.

In some implementations, as described herein, example 100 may be used to enable development teams to release new or updated modular application components via a CI/CD pipeline that automatically registers or otherwise onboards information indicating that the new or updated modular application components are available to the component marketplace. For example, the modular application components may be integrated into one or more modular software applications that are designed using an MFE architecture or another suitable modular architecture pattern. For example, the modular architecture pattern may decompose modular software applications into various independently deployable modular application components that each represent a specific feature, function, or other aspect of the overall modular software application. Furthermore, the modular software application may be configured in accordance with an MFE contract that establishes a well-defined set of interfaces and/or communication protocols between a user interface shell and other application components to reduce tight coupling and ensure interoperability between and among different modular application components. In this way, the modular software application may support decentralized development (e.g., enabling different development teams to work on different modular application components independently, which promotes autonomy and faster development cycles, and/or robust CI/CD pipelines to automate testing, building, and/or deployment processes while reducing operational overhead).

For example, as shown in FIG. 1, and by reference number 110, a user of a developer device (e.g., a software developer) may commit code to a source code management system. In some implementations, as described herein, the code that the user commits to the source code management system may generally include a modular application component (e.g., associated with an MFE architecture or another suitable modular architecture) and/or an update to a modular application component. In some implementations, as described herein, the code that is committed to the source code management system may be associated with a contract, a manifest, or another suitable document that outlines details and requirements associated with each modular application component that is included in a modular software application. For example, the details and requirements outlined in the contract, manifest, or other suitable document may include a name of each modular application component, a current version of each modular application component, one or more dependencies associated with each modular application component (e.g., other modular application components that a current modular application component depends upon and/or other modular application components that depend upon the current modular application component), and/or other relevant information. Furthermore, in some implementations, the contract, manifest, and/or other suitable documentation may indicate ownership information for each modular application component, where the ownership information may identify one or more teams or personnel responsible for developing, maintaining, and/or updating each modular application component. In some implementations, development teams that are responsible for developing, maintaining, and/or updating each respective modular application component may define and manage their own contracts, manifests, and/or other documentation. Furthermore, in some implementations, teams may manually provide the contracts, manifests, and/or other documentation to the source code management system and/or the release management system (e.g., via the developer device), or the contracts, manifests, and/or other documentation may be provided to the source code management system and/or the release management system via one or more APIs.

As further shown in FIG. 1, and by reference number 120, the source code management system may then release a build of the code to a release management system that may integrate with a CI/CD pipeline to automatically register the code in the component marketplace. For example, when the developer commits the code to the source code management system, the source code management system may perform various functions on the committed code, such as performing a vulnerability scan on the committed code (e.g., to ensure that the committed code does not contain any viruses, malware, code flaws, or other vulnerabilities that provide opportunities for potential misuse, exploits, breaches, ransomware attacks, or other cybersecurity issues). Additionally, or alternatively, the source code management system may perform one or more testing functions, such as unit, functional, and/or performance tests. Additionally, or alternatively, the source code management system may perform other suitable functions, such as tracking modifications to a source code repository, tracking changes to a code base to enable A/B testing and/or rollbacks, resolving conflicts when merging updates from multiple contributors, and/or providing version control for the modular application components that are managed through the source code management system. Accordingly, in some implementations, the source code management system may release the committed code to the release management system based on a determination that the committed code has passed a vulnerability check, one or more tests, and/or any other checks managed through the source code management system (e.g., conflict resolution). Alternatively, in cases where the committed code fails a vulnerability check, fails one or more tests, and/or any other issues are identified with the committed code, the source code management system may send one or more messages to the developer device to resolve the issues and/or indicate that the committed code will not be released until the issues are resolved.

As further shown in FIG. 1, and by reference number 130, the release management system may then publish the committed code associated with the modular application component to an artifact repository (e.g., a source code repository) via a CI/CD pipeline. Furthermore, as shown by reference number 140, the release management system may send, to the component registry via the CI/CD pipeline, a request to register the committed code associated with the modular application component. For example, as described herein, the release management system may integrate with the CI/CD pipeline that development teams use to distributed modular application components and updates to modular application components that can be used in one or more modular software applications, where each code commit may correspond to a release of a new modular application component, a new version of a modular application component (e.g., from version x to version x+1, from version x.y to version x.y+1, or the like) and/or a rollback to an earlier version of a modular application component (e.g., from version x to version x−1, from version x.y to version x.y−1, or the like).

For example, in some implementations, the CI/CD pipeline integrated with the release management system may be configured to generate a release event that is published to an update stream topic each time that the source code management system releases a new artifact associated with a modular application component to the release management system. In some implementations, as shown in FIG. 1, the component registry may include a version update listener (or event listener) that subscribes to the update stream topic, whereby the component registry may then capture and process each release event that the release management system publishes to the update stream topic. For example, in some implementations, the component registry may perform one or more API calls to obtain additional details related to the modular application component that the release management system is requesting to register (e.g., the version of the modular application component, release notes associated with the modular application component, or the like). In some implementations, as shown, the component registry may include an internal component registry API that enables communication with the version update listener to detect the release event published by the release management system.

Accordingly, when an inbound request to register an updated version of a modular application component is detected by the version update listener of the component registry, the version update listener may invoke the internal component registry API to perform a data read operation to obtain the appropriate details related to the modular application component from the release management system. For example, the internal component registry API may send a request to an API gateway at an interface between the component registry and the release management system, and the release management system may respond to the request with the appropriate details related to the updated application component. As shown by reference number 150, the component registry may then register the modular application component or updated modular application component. For example, in some implementations, the component registry may register the update to the application component by storing the information related to the update to the application components in a local data repository, such as a DynamoDB database, that offers a fast persistent key-value datastore with native support for replication, auto-scaling, encryption at rest, and on-demand backup, among other examples. In some implementations, as described herein, the information that is stored in the local data repository may be stored in a registered application component manifest to enable runtime discovery and loading of the updated application component and/or to enable discovery via the component marketplace. Additionally, or alternatively, in some implementations, the registered MFE component manifest may be stored in a cache memory (e.g., a DynamoDB Accelerator (DAX) cache) that provides a highly available, in-memory cache for the local data repository (e.g., to reduce a response time when information related to modular application components is requested).

As further shown in FIG. 1, and by reference number 160, the MFE component registry may publish, to a component marketplace accessible to one or more users associated with one or more developer devices (e.g., users on the same development team as the user that submitted the code update or development teams different from the user that submitted the code update), information related to the new or updated modular application component to indicate that the new or updated modular application component is available. For example, in some implementations, the component marketplace may provide a portal to one or more API solutions to enable access to offered by an organization that develops and maintains the modular application system (e.g., on a subscription basis or to enable integration with other software applications), whereby the information related to the update to the application component may be published to the developer system such that any other users or entities that manage software applications that depend on the updated application component can obtain the update. For example, in some implementations, the information that the component registry publishes to the component marketplace may include details related to usage, documentation, owning teams, and/or other suitable information for one or more modular application components that have been released to the release management system and registered in the component registry. Accordingly, as shown by reference number 170, users associated with one or more development devices (e.g., associated with one or more developer teams) may then search for and/or access modular application components developed by other users and/or development teams.

Accordingly, as described herein, example 100 relates to techniques that may provide an automated self-onboarding process that is built into or otherwise integrated into a CI/CD pipeline for modular application components associated with a modular software architecture pattern. In particular, as described herein, example 100 relates to techniques that may be used to register modular application components associated with code that developers commit to the source code management system, whereby other developers can then search for the modular application components via the component marketplace. Furthermore, in cases where a developer identifies one or more modular application components that the developer desires to access (e.g., a modular application component that implements certain functionality and/or supports independently executing one or more backend APIs), the developer may submit a request to access the modular application component to the component marketplace. In some implementations, the component marketplace may then route the request to one or more users or development teams that own the modular application component associated with the access request (e.g., based on the registration information maintained in the component registry), and the requesting user may then obtain the modular application component and integrate the modular application component into their modular software application if the owning user(s) or development team(s) provide permission. Accordingly, as described herein, the component marketplace may provide a centralized platform for sharing and reusing modular application components, which may reduce redundant development efforts and ensure consistency in user interface components across different software applications associated with the modular architecture. For example, the component marketplace may provide one or more interfaces that present information related to a catalog of modular application components with detailed documentation, searching capabilities, filtering capabilities, and/or version control.

In this way, some implementations described herein may be used to integrate discovery of modular application components into a CI/CD pipeline associated with ongoing software development projects, which may streamline development processes and allow for faster and more efficient software development and software deployment cycles. Furthermore, some implementations may provide automated testing and deployment tools specific to application components associated with a modular (e.g., MFE) software architecture, integration with version control, and compatibility checks. Additionally, or alternatively, some implementations described herein enable scalability and flexibility, in that individual modular application components can be independently updated based on the modular CI/CD deployment strategy, which also reduces downtime and risks associated with large-scale software updates. Furthermore, in some implementations, the component marketplace may include a user interface consistency toolkit, which may provide tools and guidelines to ensure user interface consistency across modular application components, thereby maintaining a coherent user experience and design language across different software applications and development teams. The component marketplace also provides a collaborative development environment for knowledge sharing and co-development of modular application components to break down knowledge silos and foster a community of practice among frontend developers. In addition, the component marketplace may offer access to educational resources and templates, which may include learning materials, templates, starter kits, and other information that developers can access to learn about new technologies within the modular software architecture and thereby ease a learning curve for adopting new technologies and/or facilitate quicker integration into existing software development projects. In this way, the combination of a centralized component marketplace and the integration of application component discovery into the CI/CD pipeline effectively enhances the efficiency and quality of frontend development in addition to promoting a more collaborative, flexible, and innovative software development environment.

Furthermore, as described herein, some implementation may address various technical challenges to enable the discovery and sharing of modular application components among different developers or developer teams. For example, integrating modular application components and a marketplace into a CI/CD pipeline and legacy systems can be a complex process, which may potentially lead to compatibility and dependency issues. Accordingly, in some implementations, one or more of the source code management system, the release management system, the component registry, and/or the component marketplace may execute one or more adapters or middleware components to facilitate integration, and comprehensive guidelines for integration processes may be provided to the users of the developer devices. Furthermore, in order to maintain performance and reliability across various modular application components, including scenarios where the modular application components are developed using different technologies or frameworks, some implementations described herein may support standardized performance metrics and monitoring tools to consistently track and optimize the performance of the modular application components. In addition, to ensure that the modular software infrastructure scales efficiently, especially in a cloud environment and without incurring excessive costs, some implementations may use cloud-native technologies (e.g., Kubernetes) for container orchestration and auto-scaling features to manage resources effectively. In addition, some implementations described herein may address security vulnerabilities that might arise due to the distributed nature of modular application components and the component marketplace by performing regular vulnerability assessments, following secure coding practices, and integrating security tools into the CI/CD pipeline. Furthermore, some implementations described herein provide a centralized design system and user interface component library to ensure consistency across various modular application components, provide a comprehensive documentation repository and a collaborative platform for knowledge sharing and community support to ensure that developers have access to the necessary information and documentation to effectively use and contribute to the component marketplace and/or provide training programs, workshops, and detailed onboarding guides to facilitate smoother transitions for developers that may be unfamiliar with the modular software architecture.

Furthermore, some implementations described herein may support advanced DevOps practices, where DevOps refers to methodologies or practices to integrate and automate the work of software development and information technology operations to improve and shorten development cycles. For example, in some implementations, the advanced DevOps practices may include automated environment provisioning, where infrastructure as code (IaC) may be implemented to automate the setup of development, testing, and production environments, enhanced monitoring and analytics that integrate monitoring and analytics tools to track the performance and usage of modular application in real-time, enabling proactive optimizations. Additionally, or alternatively, some implementations described herein may integrate artificial intelligence and/or machine learning techniques to enable predictive analytics and predict potential issues or bottlenecks in the frontend development process or in application performance and/or to support automated code review and optimization (e.g., using artificial intelligence or machine learning algorithms to automated code reviews and provide optimization suggestions). Additionally, or alternatively, some implementations described herein may support progressive web applications, which may be developed using the modular application components that are shared via the component marketplace to provide a native app-like experience, including offline capabilities and improved performance. Additionally, or alternatively, some implementations described herein may support a mobile-first approach to enhance accessibility and user engagement, enhanced security measures such as robust security protocols integrating advanced security protocols and tools to ensure the safety of the modular application components (e.g., in a distributed development environment), regular security audits and continuous security monitoring practices, cross-platform development tools such as a unified development framework that supports cross-platform development and enables modular application components to be seamlessly used across web, mobile, and desktop applications, and improved documentation and onboarding processes (e.g., providing comprehensive and up-to-date documentation for modular application components to facilitate easier integration and use, streamlined onboarding via tutorials and guides for new developers, or the like). In this way, some implementations described herein provide various techniques that can be used to continually refine and advance frontend development strategies, ensuring that the software development strategies remain efficient, scalable, secure, and user-friendly.

As indicated above, FIG. 1 is provided as an example. Other examples may differ from what is described with regard to FIG. 1.

Figure 2:
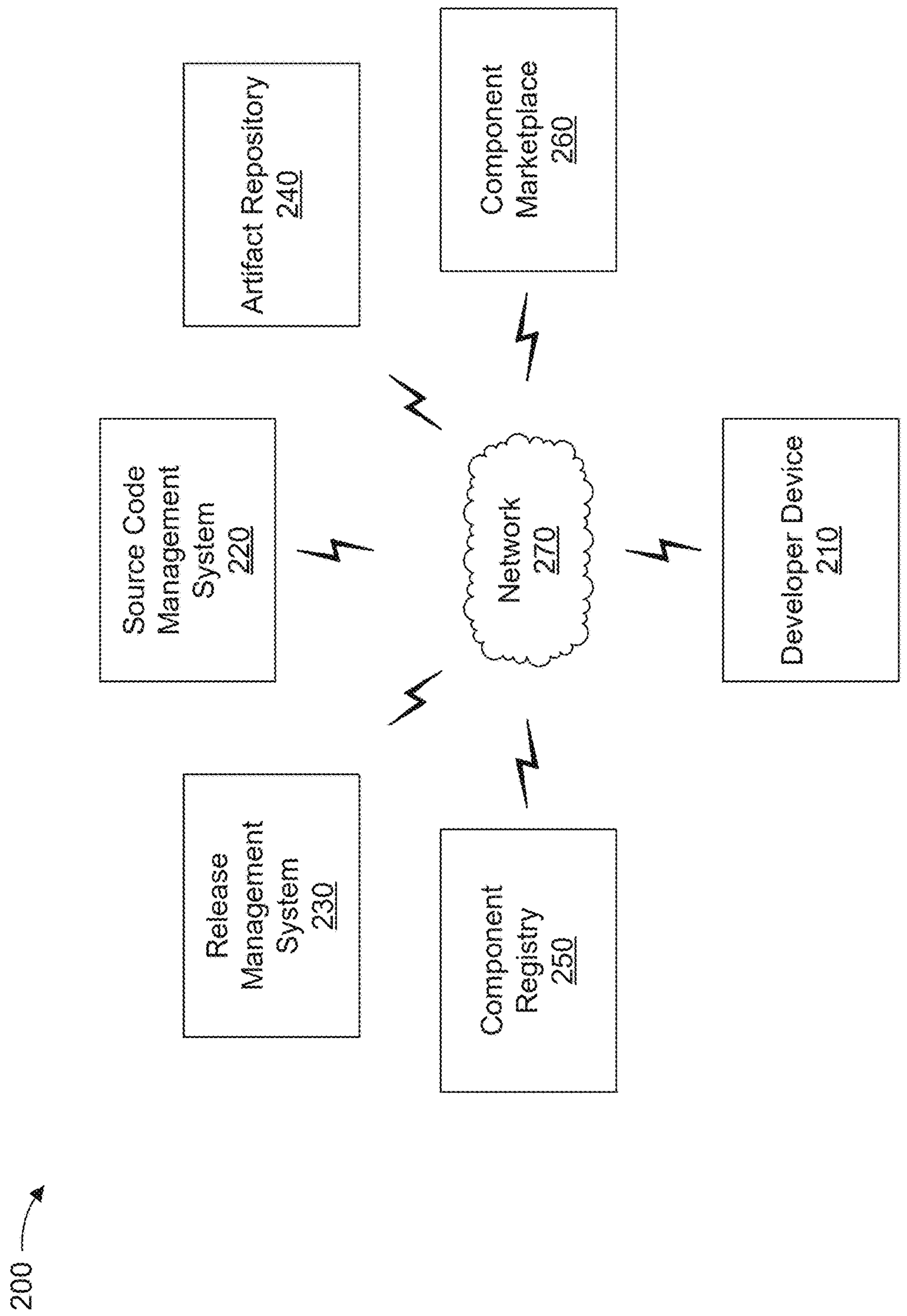
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a developer device 210, a source code management system 220, a release management system 230, an artifact repository 240, a component registry 250, a component marketplace 260, and a network 270. Devices of environment 200 may interconnect via wired connections, wireless connections, or a combination of wired and wireless connections.

The developer device 210 may include one or more devices capable of receiving, generating, storing, processing, and/or providing information associated with discovering modular application components using CI/CD and the component marketplace 260, as described elsewhere herein. The developer device 210 may include a communication device and/or a computing device. For example, the developer device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The source code management system 220 may include one or more devices capable of receiving, generating, storing, processing, providing, and/or routing information associated with discovering modular application components using CI/CD and the component marketplace 260, as described elsewhere herein. The source code management system 220 may include a communication device and/or a computing device. For example, the source code management system 220 may include a server, such as an application server, a client server, a web server, a database server, a host server, a proxy server, a virtual server (e.g., executing on computing hardware), or a server or computing hardware used in a cloud computing system.

The release management system 230 may include one or more devices capable of receiving, generating, storing, processing, providing, and/or routing information associated with discovering modular application components using CI/CD and the component marketplace 260, as described elsewhere herein. The release management system 230 may include a communication device and/or a computing device. For example, the release management system 230 may include a server, such as an application server, a client server, a web server, a database server, a host server, a proxy server, a virtual server (e.g., executing on computing hardware), or a server in a cloud computing system. In some implementations, the release management system 230 may include computing hardware used in a cloud computing environment.

The artifact repository 240 may include one or more devices capable of receiving, generating, storing, processing, and/or providing information associated with discovering modular application components using CI/CD and the component marketplace 260, as described elsewhere herein. The artifact repository 240 may include a communication device and/or a computing device. For example, the artifact repository 240 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The component registry 250 may include one or more devices capable of receiving, generating, storing, processing, providing, and/or routing information associated with discovering modular application components using CI/CD and the component marketplace 260, as described elsewhere herein. The component registry 250 may include a communication device and/or a computing device. For example, the component registry 250 may include a server, such as an application server, a client server, a web server, a database server, a host server, a proxy server, a virtual server (e.g., executing on computing hardware), or a server in a cloud computing system. In some implementations, the component registry 250 may include computing hardware used in a cloud computing environment.

The component marketplace 260 may include one or more devices capable of receiving, generating, storing, processing, providing, and/or routing information associated with discovering modular application components using CI/CD, as described elsewhere herein. The component marketplace 260 may include a communication device and/or a computing device. For example, the component marketplace 260 may include a server, such as an application server, a client server, a web server, a database server, a host server, a proxy server, a virtual server (e.g., executing on computing hardware), or a server in a cloud computing system. In some implementations, the component marketplace 260 may include computing hardware used in a cloud computing environment.

The network 270 may include one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
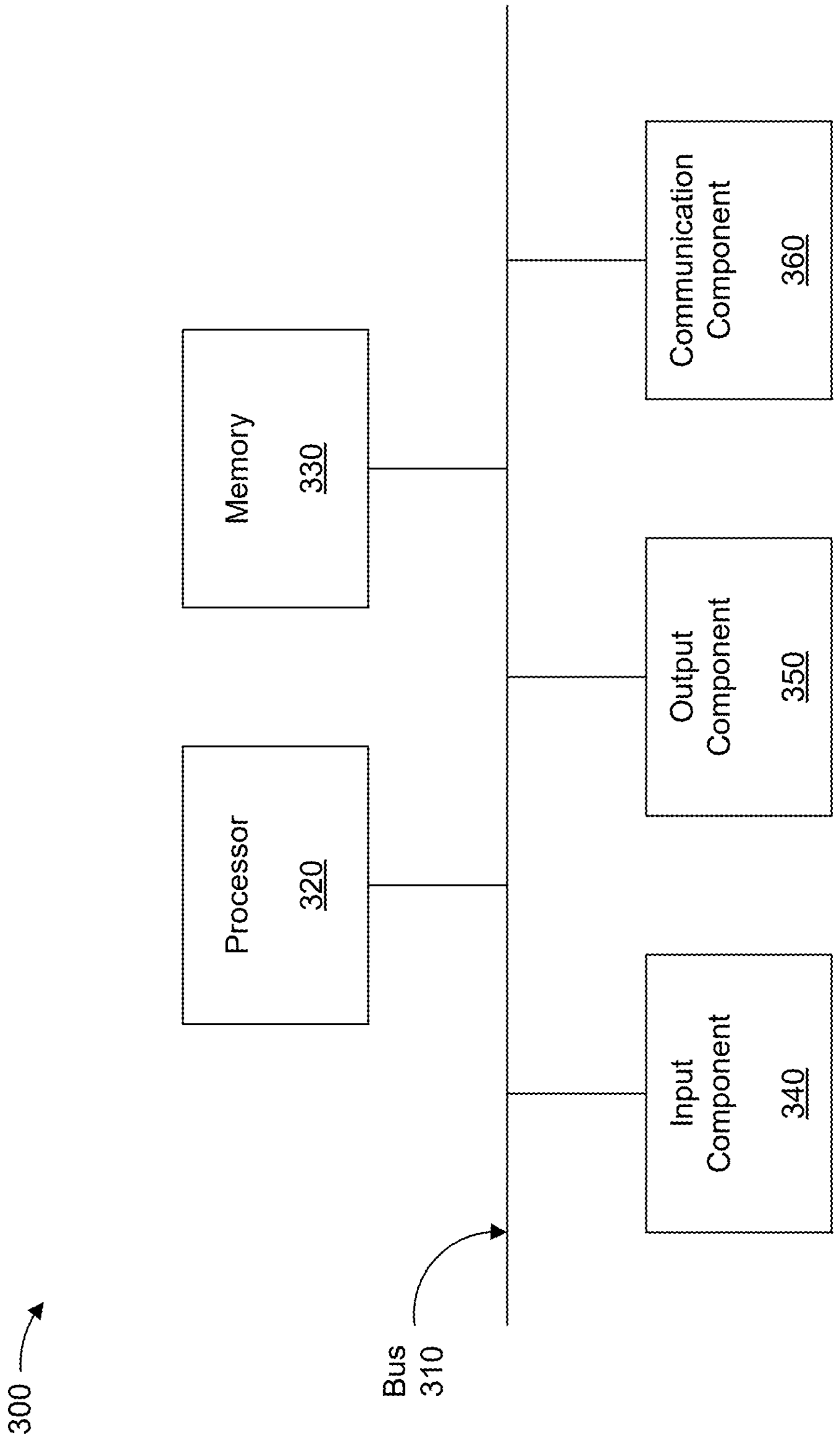
FIG. 3 is a diagram of example components of a device associated with discovering modular application components using CI/CD and a component marketplace, in accordance with some embodiments of the present disclosure.

FIG. 3 is a diagram of example components of a device 300 associated with a modular application system supporting runtime discovery of updated application components. The device 300 may correspond to the developer device 210, the source code management system 220, the release management system 230, the artifact repository 240, the component registry 250, and/or the component marketplace 260. In some implementations, the developer device 210, the source code management system 220, the release management system 230, the artifact repository 240, the component registry 250, and/or the component marketplace 260 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300.

In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
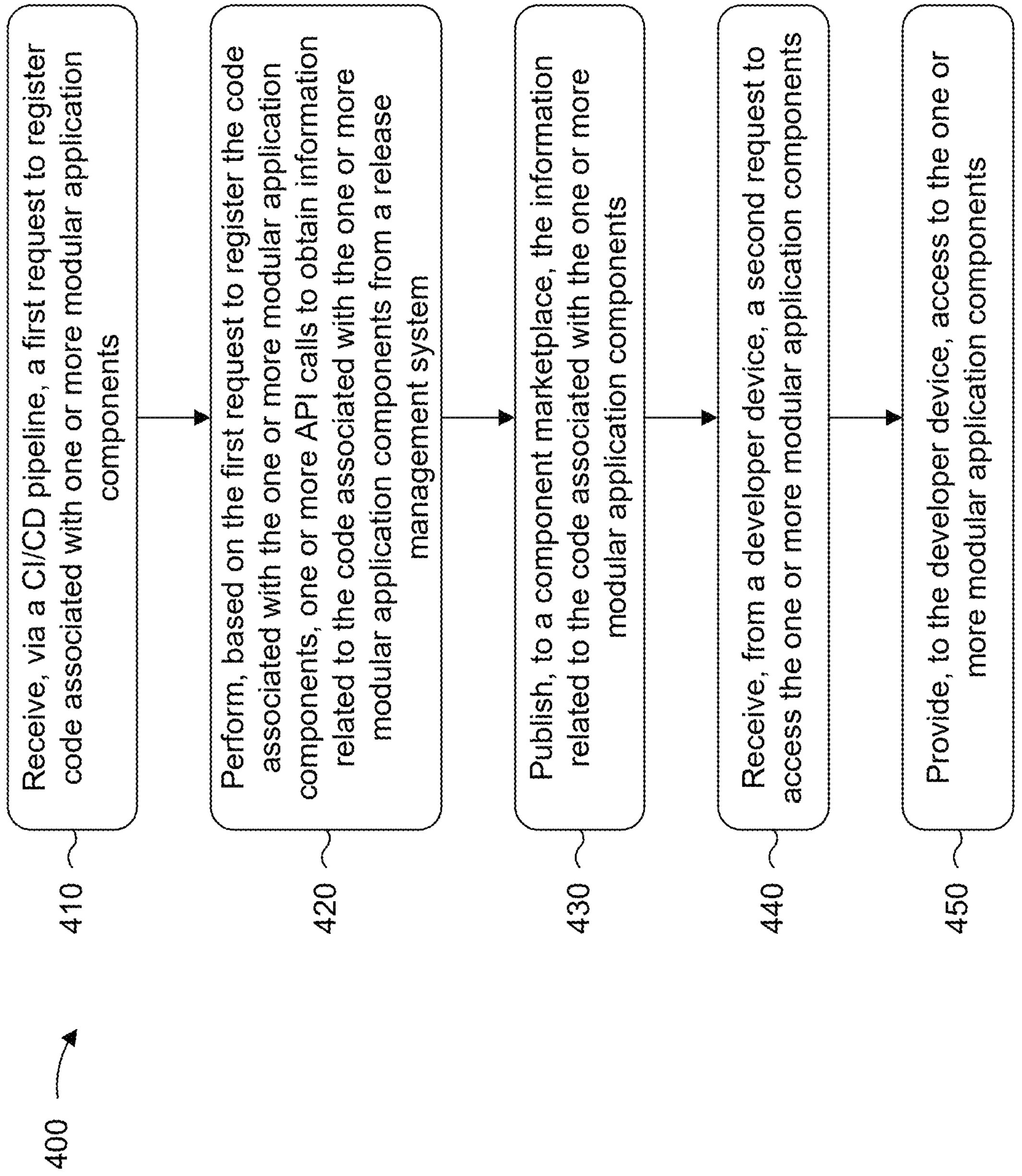
FIG. 4 is a flowchart of an example process associated with discovering modular application components using CI/CD and a component marketplace, in accordance with some embodiments of the present disclosure.

FIG. 4 is a flowchart of an example process 400 associated with discovering modular application components using CI/CD and a component marketplace. In some implementations, one or more process blocks of FIG. 4 may be performed by the component registry 250. In some implementations, one or more process blocks of FIG. 4 may be performed by another device or a group of devices separate from or including the component registry 230, such as the developer device 210, the source code management system 220, the release management system 230, the artifact repository 240, and/or the component marketplace 260. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, via a CI/CD pipeline, a first request to register code associated with one or more modular application components (block 410). For example, the component registry (e.g., using processor 320, memory 330, input component 340, and/or communication component 360) may receive, via a CI/CD pipeline, a first request to register code associated with one or more modular application components, as described above in connection with reference number 140 of FIG. 1. As an example, a release management system may integrate with a CI/CD pipeline or other tools that development teams use to release new artifacts associated with one or more application components, and the release management system may publish a release event to an update stream topic that the component registry is subscribed to in order to indicate that a new artifact has been released to the release management system.

As further shown in FIG. 4, process 400 may include performing, based on the first request to register the code associated with the one or more modular application components, one or more application program interface (API) calls to obtain information related to the code associated with the one or more modular application components from a release management system (block 420). For example, the component registry (e.g., using processor 320 and/or memory 330) may perform, based on the first request to register the code associated with the one or more modular application components, one or more application program interface (API) calls to obtain information related to the code associated with the one or more modular application components from a release management system, as described above in connection with reference number 150 of FIG. 1. As an example, the component registry may include an internal API that can be invoked by an event listener that detects the release event published by the release management system in order to obtain further details related to the updated application component from the release management system.

As further shown in FIG. 4, process 400 may include publishing, to a component marketplace, the information related to the code associated with the one or more modular application components (block 430). For example, the component registry (e.g., using processor 320 and/or memory 330) may publish, to a component marketplace, the information related to the code associated with the one or more modular application components, as described above in connection with reference number 160 of FIG. 1. As an example, the component registry may publish information related to usage of the one or more modular application components, documentation related to the one or more application components, one or more owning users that developed and manage the one or more modular application components such that other developers or developer teams can discover and reuse the modular application components.

As further shown in FIG. 4, process 400 may include receiving, from a developer device, a second request to access the one or more modular application components (block 440). For example, the component marketplace (e.g., using processor 320, memory 330, input component 340, and/or communication component 360) may receive, from a developer device, a second request to access the one or more modular application components, as described above in connection with reference number 170 of FIG. 1. As an example, the component marketplace may provide one or more interfaces that users can use to browse the modular application components that have been released to the release management system and registered in the component registry, such that developers can then request access to modular application components that other developers have created.

As further shown in FIG. 4, process 400 may include providing, to the developer device, access to the one or more modular application components (block 450). For example, the component marketplace (e.g., using processor 320 and/or memory 330) may provide, to the developer device, access to the one or more modular application components, as described above in connection with reference number 170 of FIG. 1. As an example, the component marketplace may route the request to the owning user(s) and provide access to the one or more modular application components if and/or when the owning user(s) grant permission.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIG. 1. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for discovering modular application components using continuous integration (CI) and continuous delivery (CD) (CI/CD) and a component marketplace, comprising:

one or more memories; and one or more processors, communicatively coupled to the one or more memories, configured to:

receive, via a CI/CD pipeline, a first request to register code associated with one or more modular application components;

perform, based on the first request to register the code associated with the one or more modular application components, one or more application program interface (API) calls to a release management system, via an API gateway at an interface between a component registry and the release management system, to obtain information related to the code associated with the one or more modular application components from the release management system;

publish, to the component marketplace, the information related to the code associated with the one or more modular application components;

receive, from a developer device, a second request to access the one or more modular application components; and provide, to the developer device, access to the one or more modular application components.

2. The system of claim 1, wherein the first request is published to a component update stream topic by a release management system.

3. The system of claim 1, wherein the one or more processors are further configured to:

route the second request to one or more users that own the code associated with the one or more modular application components, wherein access to the one or more modular application components is provided to the developer device based on the one or more users that own the code associated with the one or more modular application components granting the second request.

4. The system of claim 1, wherein the one or more processors are further configured to:

provide access to documentation associated with the one or more modular application components.

5. The system of claim 1, wherein the one or more processors are further configured to:

provide access to one or more educational resources that provide guidelines for integrating the one or more modular application components into a modular software application.

6. The system of claim 1, wherein the first request is received based on one or more systems in the CI/CD pipeline determining that the code associated with the one or more modular application components has passed a vulnerability check and one or more functional tests.

7. The system of claim 1, wherein the one or more processors are further configured to:

use one or more artificial intelligence or machine learning algorithms to one or more of:

predict one or more issues or bottlenecks in the CI/CD pipeline or performance of the one or more modular application components, automate a review of the code associated with the one or more modular application components, or suggest one or more optimizations to the code associated with the one or more modular application components based on an automated review of the code.

8. A method for discovering modular application components using continuous integration (CI) and continuous delivery (CD) (CI/CD), comprising:

receiving, by a system, via a CI/CD pipeline, a first request to register code associated with one or more modular application components;

performing, by the system and based on the first request to register the code associated with the one or more modular application components, one or more application program interface (API) calls to a release management system, via an API gateway at an interface between a component registry and the release management system, to obtain information related to the code associated with the one or more modular application components from the release management system;

publishing, by the system, to a component marketplace, the information related to the code associated with the one or more modular application components;

receiving, by the system and from a developer device, a second request to access the one or more modular application components; and providing, by the system and to the developer device, access to the one or more modular application components.

9. The method of claim 8, wherein the first request is published to a component update stream topic by a release management system.

10. The method of claim 8, further comprising:

routing the second request to one or more users that own the code associated with the one or more modular application components, wherein access to the one or more modular application components is provided to the developer device based on the one or more users that own the code associated with the one or more modular application components granting the second request.

11. The method of claim 8, further comprising:

providing access to documentation associated with the one or more modular application components.

12. The method of claim 8, further comprising:

providing access to one or more educational resources that provide guidelines for integrating the one or more modular application components into a modular software application.

13. The method of claim 8, wherein the first request is received based on one or more systems in the CI/CD pipeline determining that the code associated with the one or more modular application components has passed a vulnerability check and one or more functional tests.

14. The method of claim 8, further comprising:

using one or more artificial intelligence or machine learning algorithms to one or more of:

predict one or more issues or bottlenecks in the CI/CD pipeline or performance of the one or more modular application components, automate a review of the code associated with the one or more modular application components, or suggest one or more optimizations to the code associated with the one or more modular application components based on an automated review of the code.

15. A non-transitory computer-readable medium storing a set of instructions, the set of instructions comprising:

one or more instructions that, when executed by one or more processors of a system, cause the system to:

receive, via a continuous integration (CI) and continuous delivery (CD) (CI/CD) pipeline, a first request to register code associated with one or more modular application components;

perform, based on the first request to register the code associated with the one or more modular application components, one or more application program interface (API) calls to a release management system, via an API gateway at an interface between a component registry and the release management system, to obtain information related to the code associated with the one or more modular application components from the release management system;

publish, to a component marketplace, the information related to the code associated with the one or more modular application components;

receive, from a developer device, a second request to access the one or more modular application components; and provide, to the developer device, access to the one or more modular application components.

16. The non-transitory computer-readable medium of claim 15, wherein the first request is published to a component update stream topic by a release management system.

17. The non-transitory computer-readable medium of claim 15, wherein the one or more instructions further cause the system to:

route the second request to one or more users that own the code associated with the one or more modular application components, wherein access to the one or more modular application components is provided to the developer device based on the one or more users that own the code associated with the one or more modular application components granting the second request.

18. The non-transitory computer-readable medium of claim 15, wherein the one or more instructions further cause the system to:

provide access to documentation associated with the one or more modular application components.

19. The non-transitory computer-readable medium of claim 15, wherein the one or more instructions further cause the system to:

provide access to one or more educational resources that provide guidelines for integrating the one or more modular application components into a modular software application.

20. The non-transitory computer-readable medium of claim 15, wherein the first request is received based on one or more systems in the CI/CD pipeline determining that the code associated with the one or more modular application components has passed a vulnerability check and one or more functional tests.

* * * * *